United States Patent
Gilbreath

(10) Patent No.: US 9,939,090 B2
(45) Date of Patent: Apr. 10, 2018

(54) EXTRACTION DEVICE FOR REMOVING AN ADAPTER SECURED IN A PORT

(71) Applicant: The Gates Corporation, Denver, CO (US)

(72) Inventor: Donald R. Gilbreath, Castle Rock, CO (US)

(73) Assignee: Gates Corporation, Denver, CO (US)

( * ) Notice: Subject to any disclaimer, the term of this patent is extended or adjusted under 35 U.S.C. 154(b) by 126 days.

(21) Appl. No.: 13/929,593

(22) Filed: Jun. 27, 2013

(65) Prior Publication Data
US 2015/0000096 A1    Jan. 1, 2015

(51) Int. Cl.
*F16L 23/00*    (2006.01)
*F16B 39/02*    (2006.01)
(Continued)

(52) U.S. Cl.
CPC ............ *F16L 21/08* (2013.01); *F16L 19/005* (2013.01); *F16L 19/02* (2013.01);
(Continued)

(58) Field of Classification Search
CPC ..... F16L 21/08; F16L 19/005; F16L 2201/10; F16L 19/00; F16L 23/00; F16B 39/00;
(Continued)

(56) References Cited

U.S. PATENT DOCUMENTS

| 410,780 | A | * | 9/1889 | Cahn | ................ B23B 51/0426 29/281 |
| 1,815,500 | A | * | 7/1931 | Doan | ................ B25B 23/103 81/113 |

(Continued)

FOREIGN PATENT DOCUMENTS

| CN | 2734418 Y | 10/2005 |
| DE | 1478853 A1 | 9/1969 |

(Continued)

OTHER PUBLICATIONS

European Patent Office, Notification of Transmittal Of the International Search Report and the Written Opinion of the International Searching Authority, Or the Declaration, dated Sep. 30, 2014.
(Continued)

*Primary Examiner* — Bayan Salone
(74) *Attorney, Agent, or Firm* — Paul N. Dunlap, Esq.; Jeffrey A. Thurnau, Esq.

(57) ABSTRACT

This disclosure relates generally to couplings used in mining and other applications. An extraction device for removing an adapter from a port formed in a structure is provided. The extraction device may include an end wall and a side wall. The end wall may define an external face of the extraction device. The side wall may extend axially away from a periphery of the end wall. The side wall may terminate at an end face of the extraction device. The end face may have a larger dimension than the port so as to abut the structure adjacent to a periphery of the port. The side wall may include an inner surface and an outer surface. The inner surface may have a threaded portion.

2 Claims, 15 Drawing Sheets

(51) Int. Cl.
*F16B 39/04* (2006.01)
*F16B 39/10* (2006.01)
*F16L 19/00* (2006.01)
*F16L 19/02* (2006.01)
*F16L 21/08* (2006.01)

(52) U.S. Cl.
CPC ...... *F16L 2201/10* (2013.01); *Y10T 29/49815* (2015.01); *Y10T 29/49948* (2015.01); *Y10T 29/5367* (2015.01)

(58) Field of Classification Search
CPC .. F16B 39/101; F16B 39/02; Y10T 29/49815; Y10T 29/49948; Y10T 29/5367
USPC ............................ 29/426.1, 426.4; 81/52, 53.2
See application file for complete search history.

(56) References Cited

U.S. PATENT DOCUMENTS

| | | | |
|---|---|---|---|
| 2,178,298 A | 10/1939 | Bowan | |
| 2,247,427 A | 7/1941 | Mueller et al. | |
| 2,598,109 A | 5/1952 | Chasar | |
| 2,916,813 A * | 12/1959 | Belanger | B25B 27/023 29/256 |
| 2,933,960 A * | 4/1960 | Tann et al. | 81/53.2 |
| 3,104,569 A * | 9/1963 | Davis et al. | 81/53.2 |
| 3,292,463 A | 12/1966 | McKean | |
| 3,529,497 A * | 9/1970 | Brooks | B25B 27/02 173/91 |
| 3,718,058 A * | 2/1973 | Jones, Jr. | B25B 23/103 81/53.2 |
| 3,727,491 A * | 4/1973 | Buckwalter | 81/53.2 |
| 3,740,814 A * | 6/1973 | Marshall | B25B 23/103 29/264 |
| 3,777,356 A | 12/1973 | Hemingway | |
| 3,805,863 A * | 4/1974 | Starr | F16B 31/021 411/335 |
| 4,043,575 A * | 8/1977 | Roth | F16L 39/00 285/377 |
| 4,135,742 A * | 1/1979 | Anderson | F16L 27/026 285/145.1 |
| 4,624,323 A * | 11/1986 | Burrola | B25B 15/001 173/128 |
| 4,671,141 A * | 6/1987 | Hanson | B25B 13/065 81/441 |
| 4,741,229 A * | 5/1988 | Rachanski et al. | 81/53.2 |
| 4,940,370 A * | 7/1990 | Gipson | B25B 27/18 29/802 |
| 5,737,981 A * | 4/1998 | Hildebrand | B25B 27/18 81/120 |
| 6,336,264 B1 * | 1/2002 | von Borstel et al. | 29/267 |
| 6,811,189 B1 * | 11/2004 | DeLange et al. | 285/333 |
| 6,877,401 B1 * | 4/2005 | Giltner | B25B 13/48 81/52 |
| 7,140,087 B1 * | 11/2006 | Giltner | B25B 13/44 254/18 |
| 7,677,270 B2 * | 3/2010 | Horan | 138/89 |
| 7,757,366 B2 * | 7/2010 | Vorley et al. | 29/428 |
| 7,849,575 B2 * | 12/2010 | Hume | B25B 27/0028 29/235 |
| 8,322,367 B2 * | 12/2012 | Harris et al. | 137/597 |
| 2008/0029176 A1 * | 2/2008 | Horan | F16L 55/1108 138/89 |
| 2008/0245195 A1 * | 10/2008 | Lee | B25B 13/065 81/124.6 |
| 2009/0090415 A1 * | 4/2009 | Harris et al. | 137/7 |
| 2013/0161941 A1 * | 6/2013 | Zulauf et al. | 285/80 |

FOREIGN PATENT DOCUMENTS

| | | | | |
|---|---|---|---|---|
| DE | 19803732 A1 * | 8/1999 | | B25B 27/023 |
| EP | 212672 A1 * | 3/1987 | | B25B 23/00 |
| WO | 2004016977 A1 | 2/2004 | | |
| WO | 2006089346 A1 | 8/2006 | | |

OTHER PUBLICATIONS

Australian Government IP Australia, Patent Examination Report No. 1, Patent Application No. 2014302481, dated Jun. 7, 2016.

* cited by examiner

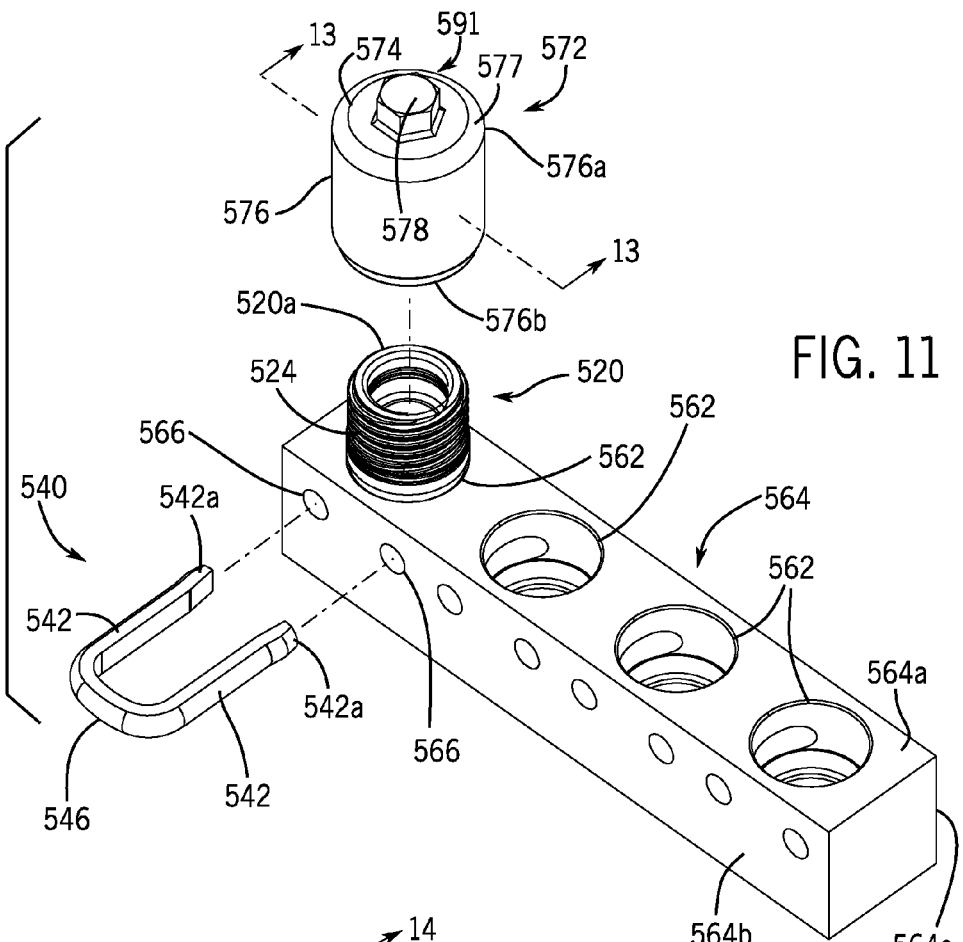
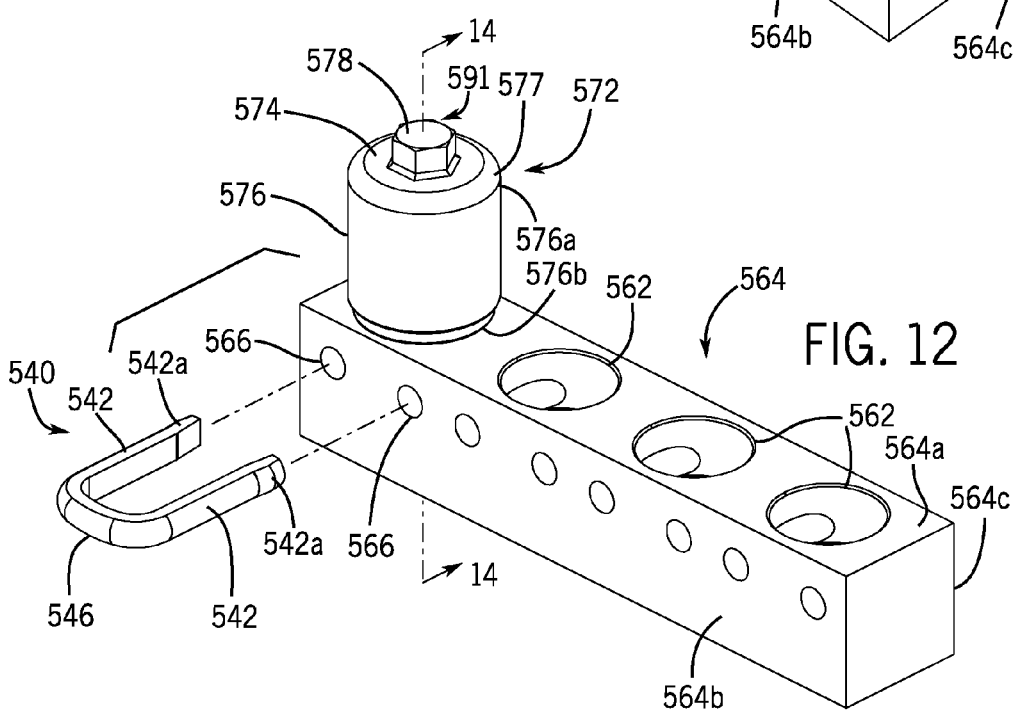

EXTRACTION DEVICE FOR REMOVING AN
ADAPTER SECURED IN A PORT

CROSS-REFERENCE TO RELATED
APPLICATIONS

This application is related to U.S. patent application Ser. No. 13/675,109, filed Nov. 13, 2012, which claims the benefit of U.S. Provisional Application No. 61/580,269, filed Dec. 26, 2011, both of which are entitled "Hand Tightened Hydraulic Fitting".

BACKGROUND

Field

This disclosure relates generally to couplings for mining and other applications, and more particularly to a device that removes an adapter from a port.

Related Art

Adapters are commonly used in mining and other applications to couple together various types of hoses, tubing, pipe, manifolds, and other suitable structures. The adapters may be difficult to disconnect or remove from the structure to which they are attached due to various factors including debris, corrosion, and mechanical interference between the components. To remove an adapter from an associated structure, field personnel often resort to physical force applied by chisels, hammers, or other readily available tools, which frequently damage the adapters and may be a time consuming process. Further, the resulting damage to the adapters, such as cracks, may be undetected and result in catastrophic failure of the coupling assembly if the adapter is used in future applications.

SUMMARY

The present disclosure is generally directed to systems and methods for removing an adapter secured in a port. Examples of the disclosure may include an extraction device for removing an adapter from a port formed in a structure. The extraction device may include an end wall and a side wall. The end wall may define an external face of the extraction device. The side wall may extend axially away from a periphery of the end wall and terminate at an end face of the extraction device. The end face of the side wall may have a larger dimension than the port so as to abut the structure adjacent to a periphery of the port. The side wall may include an inner surface and an outer surface. The inner surface may include a threaded portion.

The inner surface of the side wall may include a leading non-threaded portion extending between the end face and the threaded portion. The inner surface may include a trailing non-threaded portion extending between the threaded portion and the end wall. The leading and trailing non-threaded portions may be substantially cylindrical. The threaded portion may include a major diameter that is radially aligned with the leading non-threaded portion.

The outer surface of the side wall may define a shoulder oriented transversely to a longitudinal axis of the extraction device. The shoulder may be annular. The end wall may close one end of the side wall. The extraction device may include a keyed engagement feature, which may be a hex nut that projects axially away from the end wall.

In another example, an extraction device for removing an adapter from a port in a structure is provided. The adapter may include a first portion received within the port and a second portion protruding from the port. The second portion may include an external thread. The device may include an axially-extending side wall that defines an inner space that receives the second portion of the adapter. The side wall may include an end face that abuts a portion of the structure surrounding the port and an internal thread that threadedly engages the external thread of the adapter prior to abutment of the end face with the structure. The extraction device may be operable to axially pull the adapter from the port.

The extraction device may include an end wall that extends inwardly from the side wall. The end wall may define an external face that opposes the end face. The end wall may define a closed end of the side wall. The extraction device may include an engagement feature that is associated with the end wall and axially aligned with a longitudinal axis of the extraction device. The side wall may include an internal non-threaded portion that extends between the internal thread and the end wall. The side wall may include an external annular shoulder. The side wall may be substantially cylindrical. The first portion of the adapter may include multiple facets that collectively extend around an entire periphery of the adapter.

In another example, a method of removing an adapter from a port defined by a structure is provided. The method may include positioning an extraction device around a portion of the adapter, threadedly engaging an internal thread of the extraction device with an external thread of the adapter by rotating the extraction device about the adapter, abutting a leading edge of the extraction device against an external face of the structure, and axially extracting the adapter at least partially from the port by continuing to rotate the extraction device about the adapter after the leading edge of the extraction device is abutted against the external face of the structure.

The method further may include advancing the extraction device axially along the adapter toward the structure prior to abutting the leading edge against the structure by continuing to rotate the extraction device about the adapter. The method further may include engaging an external annular shoulder of the extraction device to move the extraction device axially away from the structure.

This summary of the disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

This summary is neither intended nor should it be construed as being representative of the full extent and scope of the present disclosure. The present disclosure is set forth in various levels of detail in this application and no limitation as to the scope of the claimed subject matter is intended by either the inclusion or non-inclusion of elements, components, or the like in this summary.

BRIEF DESCRIPTION OF THE DRAWINGS

The accompanying drawings, which are incorporated in and form part of the specification in which like numerals designate like parts, illustrate examples of the present disclosure and together with the description, serve to explain the principles of the disclosure.

FIG. 11 is a partially exploded view of the adapter, the manifold, and the retaining member of FIG. 9, with an extraction device axially separated from the exposed portion of the adapter.

FIG. 12 is a partially exploded view of the components of FIG. 11, with the extraction device threaded onto the external thread of the adapter.

DETAILED DESCRIPTION

This disclosure generally is broken into two sections. FIGS. 1-7 generally relate to a threaded coupling system including a male portion, a female portion, and a retaining member that draws the male and female portions into sealing engagement with one another when the retaining member is threadingly engaged with one of the male or female portions. A locking member may secure the retaining member to the one of the male or female portions to positively lock the male and female portions together. Either or both of the male and female portions may be coupled to a receiving structure. FIGS. 8-17 generally relate to a device that axially extracts an externally-threaded male and/or female portion (generally referred to as an adapter) from a receiving structure.

Figure 1:
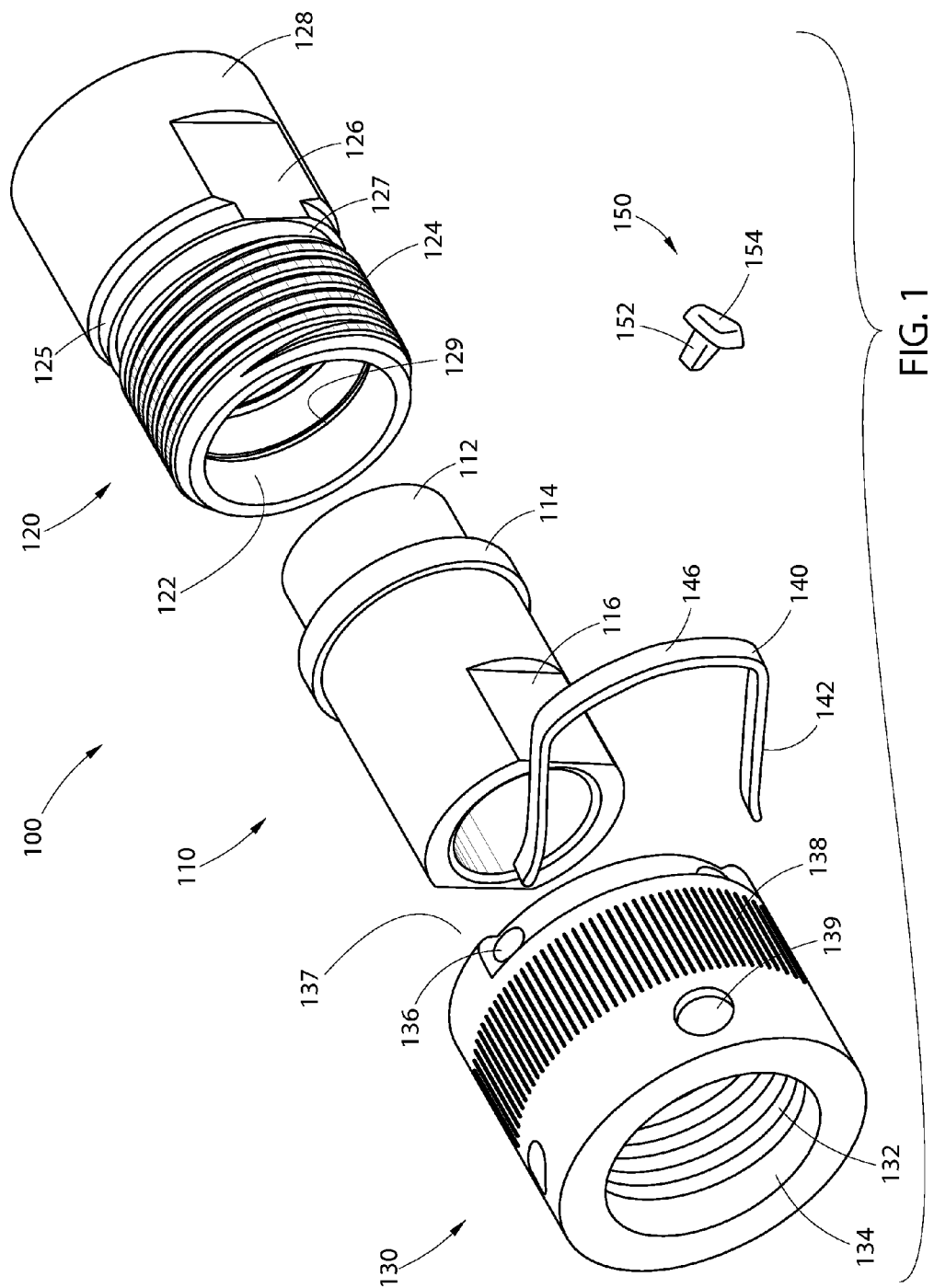
FIG. 1 is an exploded view of an example coupling system.

A coupling system 100 is shown in FIG. 1. The coupling system 100 may include a male portion 110, a female portion 120, a retaining member 130, and a locking member 140. An alternate locking member 150 may also be included in the system 100.

The male portion 110 may include an insert portion 112, a boss 114, and a hose receiving portion 116. The female portion 120 may include a receptacle portion 122, threads 124, a ridge 125, an engagement section 126, a locking groove 127, and a connection portion 128. The retaining member 130 may include threads 132, an abutment portion 134, a retainer orifice(s) 136, a lip 137, knurling 138, and an engagement section 139.

The insert portion 112 of the male portion 110 may be coupled with the receptacle portion 122 of the female portion 120 in a non-interference-type fit. The boss 114 may provide a stop or may be adjacent to or abut the female portion 120. A seal may be created between the male portion 110 and the female portion 120, preferably between their cylindrical surfaces. The seal may allow fluid to pass through the male and female portions 110, 120 without leakage.

The female portion 120 may include a seal groove 129, which may be capable of retaining a seal such as an O-ring (not shown). This configuration may enhance the sealing ability of the coupling system 100. Additionally or alternately, a seal groove capable of retaining a seal such as an O-ring may be included on the male insert portion 112. Optionally, a dust seal (not shown) may be included near the ridge 125, the groove 127, or the abutment portion 134, for example, in order to keep foreign matter out of the threads. It should be understood that the ridge 125, the groove 127, and the lip 137 are optional and may be omitted or reconfigured as desired provided the requisite locking functionality is present.

The retaining member 130 may slide over the male portion 110, such that the threads 132 of the retaining member 130 may engage corresponding threads 124 of the female portion 120. The male portion 110 may extend through the retaining member 130. The boss 114 of the male portion 110 may contact the abutment portion 134 of the retaining member 130. This may secure together the male portion 110, the female portion 120 and the retaining member 130, and may enhance the sealing between the male portion 110 and the female portion 120. Once the male portion, the female portion 120, and the retaining member 130 are secured together, the extension 142 of the locking member 140 may extend through the retainer orifice 136 of the retaining member 130 and engage the female portion 120 at the locking groove 127 such that the retaining member 130 may not uncouple from the female portion 120.

The retaining member 130 may be hand tightened, but if there is an application that requires the male portion 110 and the female portion 120 to be locked against a possible live swivel, torque may be applied to the retaining member 130 similar to other threaded connection systems and methods. For a faster connection, multiple-start threads may be used.

The locking member 140 may include an indication portion 146 that may be a visible color such as red, to indicate the coupling system 100 is engaged. This may be used as a safety indicator and/or lockout to indicate if the coupling system is engaged and able to withstand pressure.

Furthermore, the locking member 140 may be of different configurations, such as the locking member 150. The locking member 150 may include an extrusion 152 which may be capable of extending through a retainer orifice 136 to engage the locking groove 127 of the female portion 120 to generally secure the retaining member 130 to other portions of the system. The locking member 150 may also include the indication portion 154 which be made to be a visible color and/or configuration such as red, to indicate the coupling system 100 is engaged, for safety and/or other reasons.

In various embodiments, the locking member may be in the form of a special clip, staple, a snap-in button, or a wire threaded through the nut. This locking feature may not be able to be applied until the threads are fully-engaged, so it may be very clear by visual inspection as to whether a connection is properly made.

Figure 5:
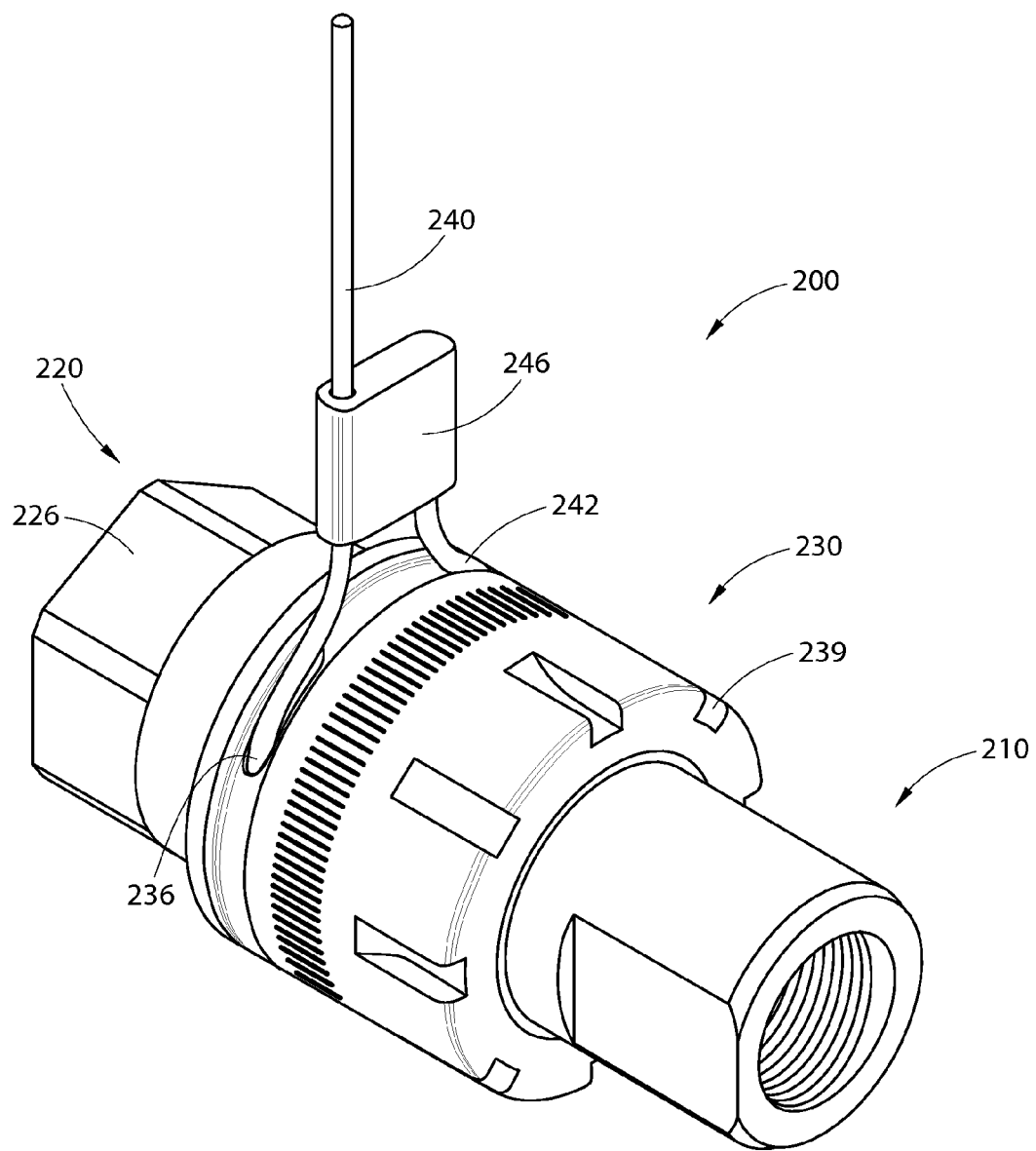
FIG. 5 is an isometric view of another example coupling system.

Referring to FIG. 5, holes 236 may be drilled or formed roughly tangent to the locking groove 127 within the retaining member 230. A plastic or metal wire tie 240 or other locking member may be threaded through the holes 236, engaging both the locking groove 127 and a locking groove in the retaining member 230 (not visible), thereby keeping the retaining member 230 from backing off and providing a visual indication of a proper connection. The wire cable tie 240 shown in FIG. 5 is in the form of a cable seal which may be designed for single use (cut to remove) or multiple use. A seal or tag 246 provides further visual indication of a proper connection and may be labeled for various identification or record-keeping purposes. Likewise other kinds of metal or plastic ties or seals may be utilized which may be for single or multiple use, with or without an identification tag, The coupling system 100 may be a coarse-thread connector that may be hand-tightened, having a locking feature that keeps the retaining member 130 from backing off, and may further provide a visual indication of a proper connection via the indication portion 146, 154, 246 of the locking member 140, 150, 240. Because the seal is generally along a cylinder, or between two cylinders, preload may not be required in the retaining member 130, and it may not have a torque load requirement. Thus hand-tightening may be sufficient to fully engage the coupling and withstand the design pressure.

Once tightened, a visible locking feature (locking member 140, 150, 240) may be applied. Therefore, this coupling system 100 may provide a visual indicator of a proper connection. An advantage is a threaded retaining member 130, which provides a mechanical advantage to draw the sealing cylinder in and out of the female portion 120 for connection and removal.

The male portion 110 may include a hose receiving portion 116, which may be capable of receiving, and coupling to, a hose, manifold or other system or apparatus. In the example of attaching to a hose, the hose receiving portion 116 may be generally in the form of a barb or other configuration capable of coupling to a hose. The portion 116 may also include an engagement section to allow torque to be applied to the male portion 110.

The female portion 120 may include a connection portion 128 that may be capable of coupling to a hose or manifold or other suitable structure. It will be appreciated that the connection portion 128 may be of many forms to couple to various hoses and other structures. The female portion 120 may include an engagement portion 126 to allow torque to be applied to the female portion 120.

The retaining member 130 may include knurling 138 or similar surface modification, which may enhance gripping and turning of the retaining member 130, especially during hand tightening. The retaining member 130 may include engagement or wrenching adaptations such as a hex, holes, slots, flats, or orifices 139 as shown, which are capable of receiving a wrench or other tool used to tighten/loosen and/or generally apply torque to the retaining member 130.

Figure 2:
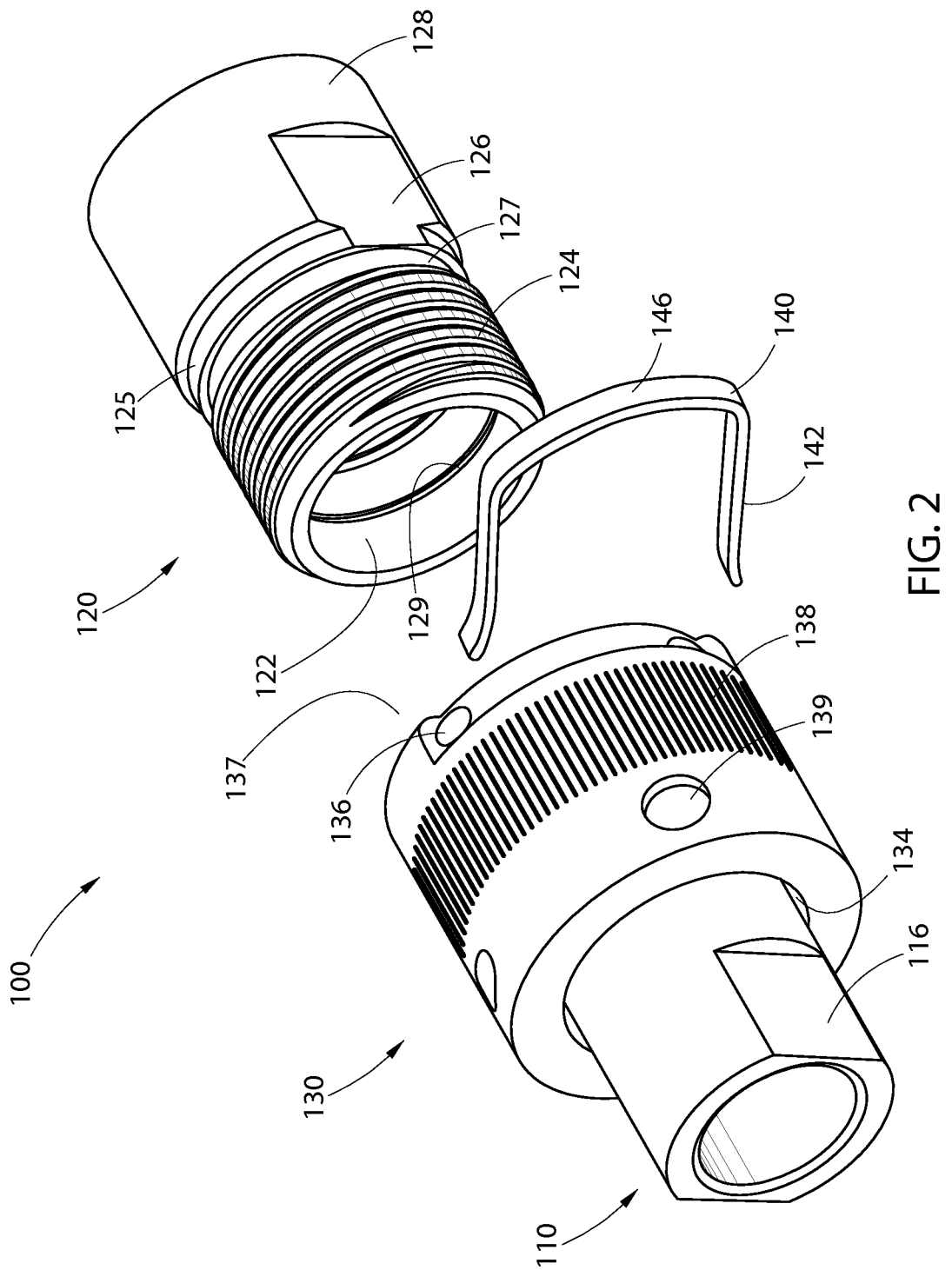
FIG. 2 is a partially exploded view of the coupling system of FIG. 1.
Figure 3:
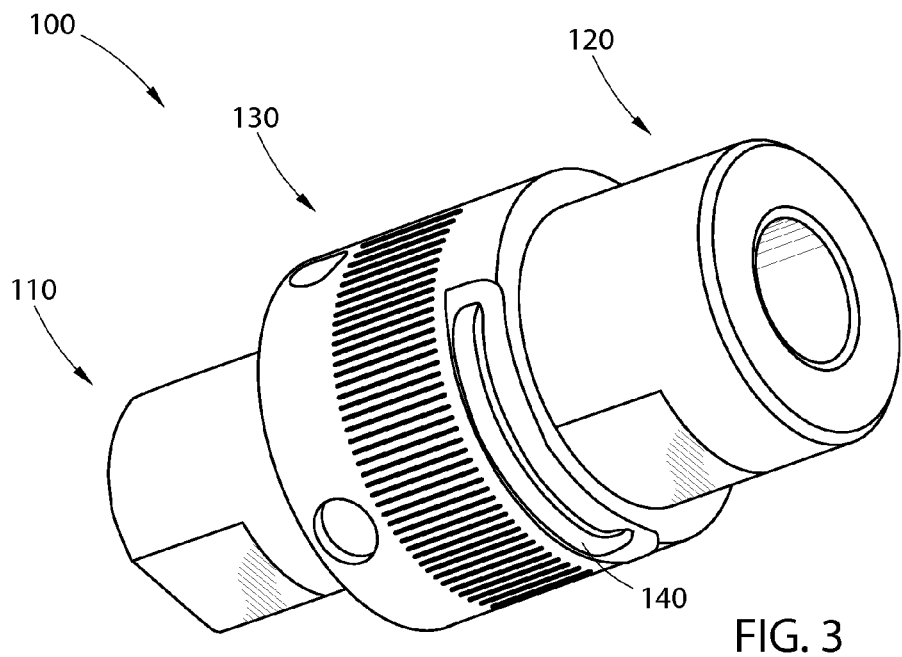
FIG. 3 is an isometric view of the coupling system of FIG. 1.

FIG. 2 shows the coupling system 100 with the retaining member 130 slid over the male portion 110, before coupling to the female portion 120. FIG. 3 shows the coupling system 100 fully engaged with the retaining member 130 coupling together the male portion 110 and the female portion 120, with the locking member 140 extending through the retainer orifices 136 and engaging the locking groove 127 (not shown).

Figure 4:
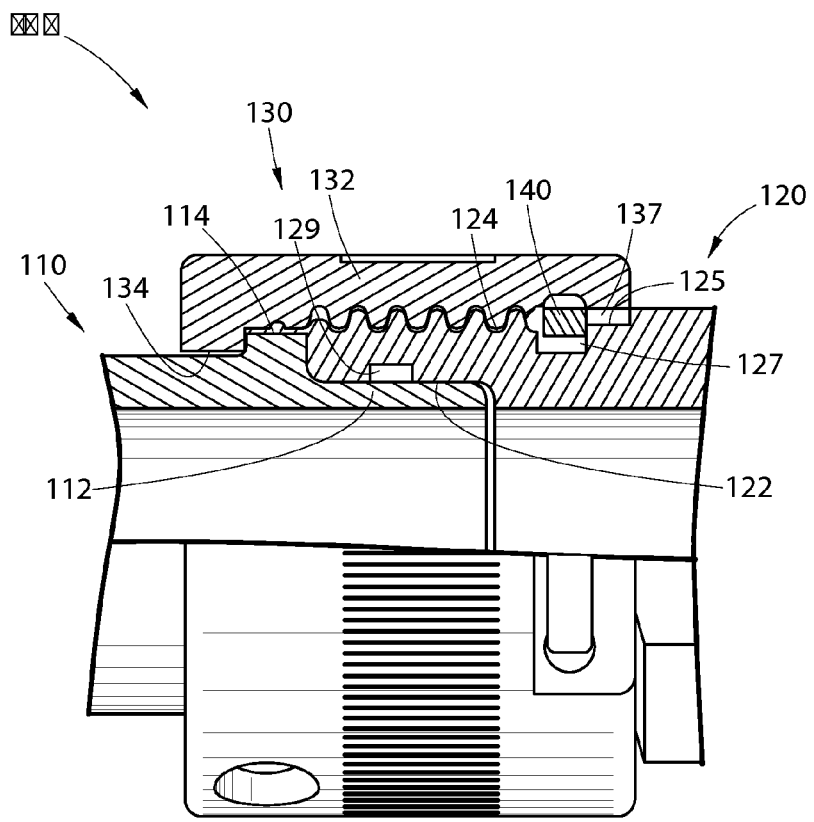
FIG. 4 is a cut-away view of the coupling system of FIG. 1.

FIG. 4 is a cut away view of a portion of the coupling system 100. As can be seen in this example, the retaining member 130 includes threads 132 which threadingly engage threads 124 of the female portion 120. This configuration does not allow the retaining member 130 to unthread from the female portion 120 when the locking member 140 is in place between the lip 137 and the side of the groove 127 near the threads 124.

The insert portion 112 of the male portion 110 generally fits within, and is coupled to, the receptacle portion 124 of the female portion 120. A first side of the boss 114 may generally abut and/or be adjacent to the female portion 120. A second side of the boss 114 may abut or generally be adjacent to the abutment portion 134 of the retaining member 130. The threading of the retaining member 130 with the female portion 120 may move and/or generally secure the male portion 110 to the female portion 120 and the retaining member 130, via the abutment portion 134.

FIG. 5 illustrates another example coupling system 200. The coupling system 200 includes a male portion 210 coupled to a female portion 220, and held together by a retaining member 230. As discussed above, the locking member 240 may be a cable seal having a cable 242 routed through tangential holes 236 and a seal or tag 246 preventing unwanted removal and providing additional visual indication the coupling is secure. The engagement feature 239 on the retaining member 230 takes the form of a series of notches which may be suitable for use of a spanner wrench. The engagement feature 226 on the female portion 220 takes the form of a hex nut. Retainer orifices in the form of tangential holes 236 are also shown on the retaining member 230 in FIG. 6.

Figure 6:
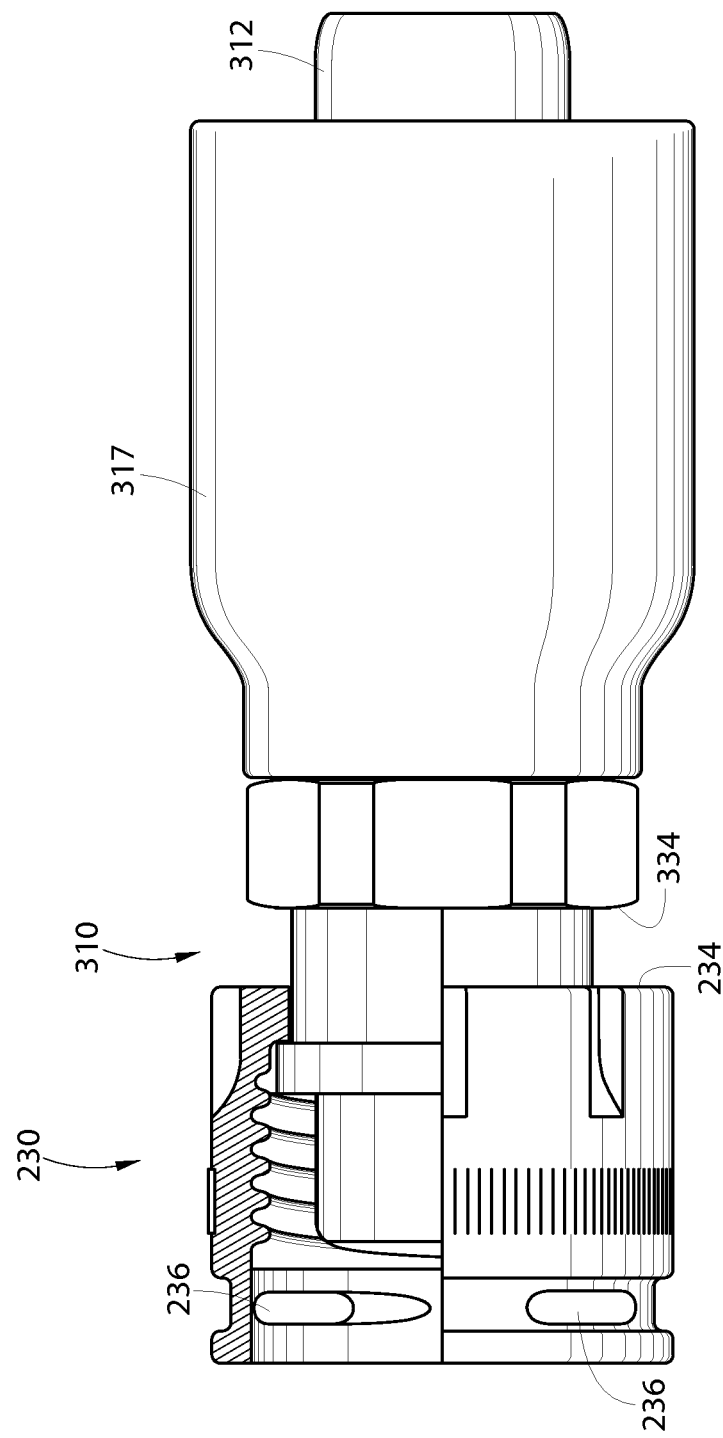
FIG. 6 is a cut-away view of a male portion and retaining member according to another example coupling system.

FIG. 6 shows another example coupling system with a male portion 310 having a hose receiving portion that includes a hose barb 312 and a ferrule 317. The retaining member 230 may be slid over the male portion into the position shown. Then the ferrule 317 may be staked or swaged or otherwise attached in place as shown. The rear face 234 of the retaining member 230 may be in fairly close proximity to and opposes the front face 334 of the ferrule. Thus, when the retaining member 230 is unthreaded from a coupled female portion, the rear face 234 may abut the front face 334 and thereby draw the male portion 310 out of the female portion, thus disconnecting the coupling. Other arrangements for connection to pipes, hoses, or manifolds may be envisioned which provide the abutment needed to draw the male portion out of the female portion when the retaining member is unthreaded, such as a two-piece, stake-collar and ferrule arrangement. On the other hand, the hose receiving portion may be threaded for receiving a hydraulic fitting with mating threads. Generally, if the threads are male threads on the hose receiving portion, any mating female fitting that connects via such male threads on the connection portion may have a face equivalent to face 334 which may abut the end 234 of the retaining portion and thus facilitate disconnection. As an alternate to relying on connected fittings, there may instead be a C-clip or other retaining clip or feature attached to the male portion which is specifically adapted to abut the end 234 of retaining portion 230 in order to facilitate disconnection of the coupling.

Figure 7:
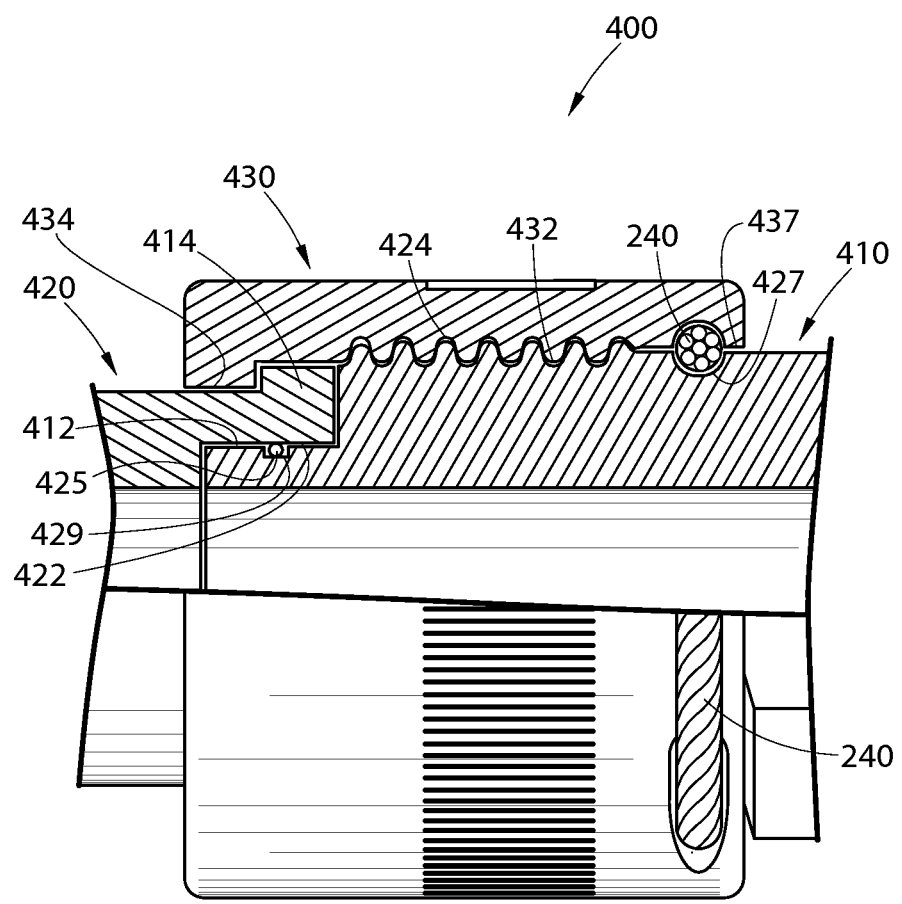
FIG. 7 is a partially fragmented view of another example coupling system.

FIG. 7 shows a coupling system in which the external threads which correspond to the retaining member are on the male portion. In FIG. 7, a coupling system 400 includes a male portion 410, a female portion 420, and a retaining member 430. The female portion 420 has a receptacle portion 422. An insert portion 412 of the male portion 410 fits into the receptacle portion 422 with an O-ring 425 housed in a seal retaining groove 429 on the insert portion 412. The O-ring thus provides a seal between the male and female portions 410, 420. The retaining member 430 has internal threads 432 which mate with external threads 424 on the male portion 410. The retaining member 430 has an abutment portion 434 which abuts a boss 414 when the retaining member 430 is slipped over the female portion 420. Thus when the retaining member 430 is threadingly engaged with the threads 424 on the male portion 410, the male portion may be drawn into sealing engagement with the female portion 420. When fully engaged, the locking member 240, shown as a cable tie, may be inserted through holes or openings or orifices in the retaining member 430 and thus routed around the coupling in a passageway defined by or between a groove 427 on the male portion 410 and a lip 437 on the retaining member 430. Note that features shown in other examples may be adapted for this example and vice versa, including seal placement(s) and type(s), hose receiving portion(s), connection portion(s), engagement section(s) or portion(s), knurling, orifice style, locking member type, and indication portion.

In use, to connect an example coupling system, the retaining member may be hand-tightened to pull the male portion into the female portion with the seal there between. To keep the retaining member from backing off, the cable tie or other locking member is inserted through holes in the retaining member into a groove in the female portion (or male portion, depending on the example) and locked. To disconnect, the cable may be cut and/or pulled out and removed so that the retaining member can be loosened. Unlike conventional staple-lock mine couplings, for example, the cable or locking member does not carry the pressure load. The threads carry the pressure load and therefore the design is capable of much higher pressure rating than a staple-lock coupling of similar diameter. If the retaining member happens to back off enough during operation to resist the locking member pulling out, simply tightening the retaining member farther will eliminate this resistance. Once the cable (or other locking device) is removed, loosening or unthreading the retaining member may separate the fitting. If necessary, a spanner wrench or other suitable tool may be used to turn the retaining member and release the fitting. The threaded retaining member may even provide enough mechanical advantage to overcome the resistance of debris and corrosion present at assembly or disassembly by hand.

The provided coupling system may overcome many issues of other threaded connections, such as assuring adequate preload in the retaining member to overcome the pressure load, easily damaged threads, and having no visual indication of complete connection. It also overcomes issues in non-threaded designs, such as high insertion force, unprotected seals, poor impulse performance, and installation of heavy locking devices such as hammer unions, clamshells, or thick staples. The advantages of the invention include the ease of hand tightening or loosening, the greater safety factor of threads over conventional staples, no torque required to seal and hold, and less mass required to achieve a given rating. Furthermore, this system may be used with lower pressure systems. This may allow the use of less expensive materials and configurations. The system may be configured to connect hose, pipes, fittings, manifolds, or the like. Systems disclosed herein may be used with, but are not limited to, 2-4" chemical hose, and/or with volume control regulators. The coupling system offers advantages over hammer unions in the oil field industry, including those used for cementing hose, slim hole rotary hose, and the like. It should be noted that other types of locking methods may optionally be used instead of the preferred locking member described above. For example, the locking member could be a c-clip inserted in a suitable groove adjacent a suitable flange. The locking method could be a frictional engagement, or it could be a bayonet style engagement or a latch, or multiple bayonets or latches.

In mining and other applications, externally-threaded male and/or female portions (generally referred to as adapters) may be positioned at least partially within a port formed in a receiving structure, such as a female connector, a manifold, or any other suitable receiving structure. A staple may be used to secure the adapter to the receiving structure. During insertion and/or operation, the staple may deform a flange associated with the adapter, thereby creating mechanical interference between the adapter and the receiving structure. The staple also may cause plating damage to the adapter and/or receiving structure, which may result in the formation of rust between the adapter and the receiving structure. These and other factors may increase the difficulty of removing the adapter from the receiving structure, which may be needed to replace seals and/or generally inspect the condition of the adapter and receiving structure.

To facilitate separation of the adapter from the receiving structure, an extraction device may be used to axially extract the adapter from the port. The device may be threaded onto a protruding portion of the adapter until an end face of the device contacts the receiving structure. After abutment of the end face of the device with a confronting face of the receiving structure, further rotation of the device about the adapter draws the adapter from the port. The threaded engagement of the device and the adapter may provide a mechanical advantage that facilitates extraction of the adapter from the receiving structure.

The extraction device may reduce the removal time of the adapter from the receiving structure, as well as reduce the likelihood of damaging the adapter or the receiving structure, thereby decreasing equipment downtime. The extraction device may include an internal thread that is axially spaced apart from an end face or leading edge of the device. The axial spacing of the internal thread from the leading edge may be dimensioned to ensure sufficient thread engagement with the adapter prior to abutment of the leading edge of the device against the receiving structure, thereby reducing the relative rotation between the device and the adapter prior to abutment, which may decrease the extraction effort and time. The device may include a hexagon or other engagement feature that interfaces with an impact wrench or other wrenching device to quickly and easily remove the adapter from the receiving structure.

Figure 8:
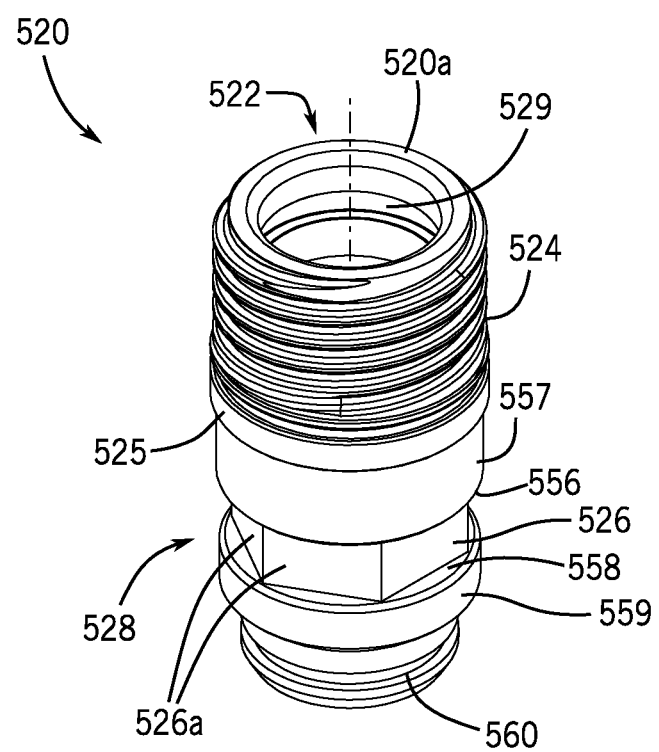
FIG. 8 is an isometric view of an example adapter.

FIG. 8 is an isometric view of an adapter 520 that may be used interchangeably with the previously discussed coupling systems. With the exception of the connection portion 528, the adapter 520 depicted in FIGS. 8-11 and 14-17 generally has the same features and operation as the previously discussed female portions 120, 220 depicted in FIGS. 1-7. Accordingly, the preceding discussion of the features and operation of the female portions 120, 220 depicted in FIGS. 1-7 is generally applicable to the adapter 520 depicted in FIGS. 8-11 and 14-17, except as noted in the following discussion.

Referring to FIG. 8, similar to the previously discussed female portions 120, 220, the adapter 520 may include a first or receptacle portion 522 for receiving an insert portion 112 of a male portion 110, 210, 310, and a seal groove 529 for receiving a seal. Also similar to the previously discussed female portions 120, 220, the adapter 520 may include an external thread 524 that terminates at a ridge 525. The external thread 524 may matingly engage an internal thread 132, 432 of a retaining member 130, 230, 430, which may threadedly secure the male portion 110, 210, 310 and the adapter 520 together. The retaining member 130, 230, 430 may receive a locking member 140, 150, 240 to positively lock the male portion 110, 210, 310 and the adapter 520 together. The adapter 520 may be referred to as a connector, coupler, or fitting.

With continued reference to FIG. 8, the adapter 520 may include a connection portion 528. The connection portion 528 may include a locking or retaining member engagement feature 526 positioned axially between a radial face 556 of an annular shoulder 557 and a radial face 558 of an annular flange 559. The retaining member engagement feature 526 may include multiple facets or flats 526a angled relative to one another. The facets 526a may collectively extend around an entire periphery of the adapter 520 axially between the radial faces 556, 558. In one example, the retaining member engagement feature 526 includes six facets 526a (see FIG. 10), although other number of facets 526a may be used. The connection portion 528 may include an external annular seal groove 560.

Figure 14:
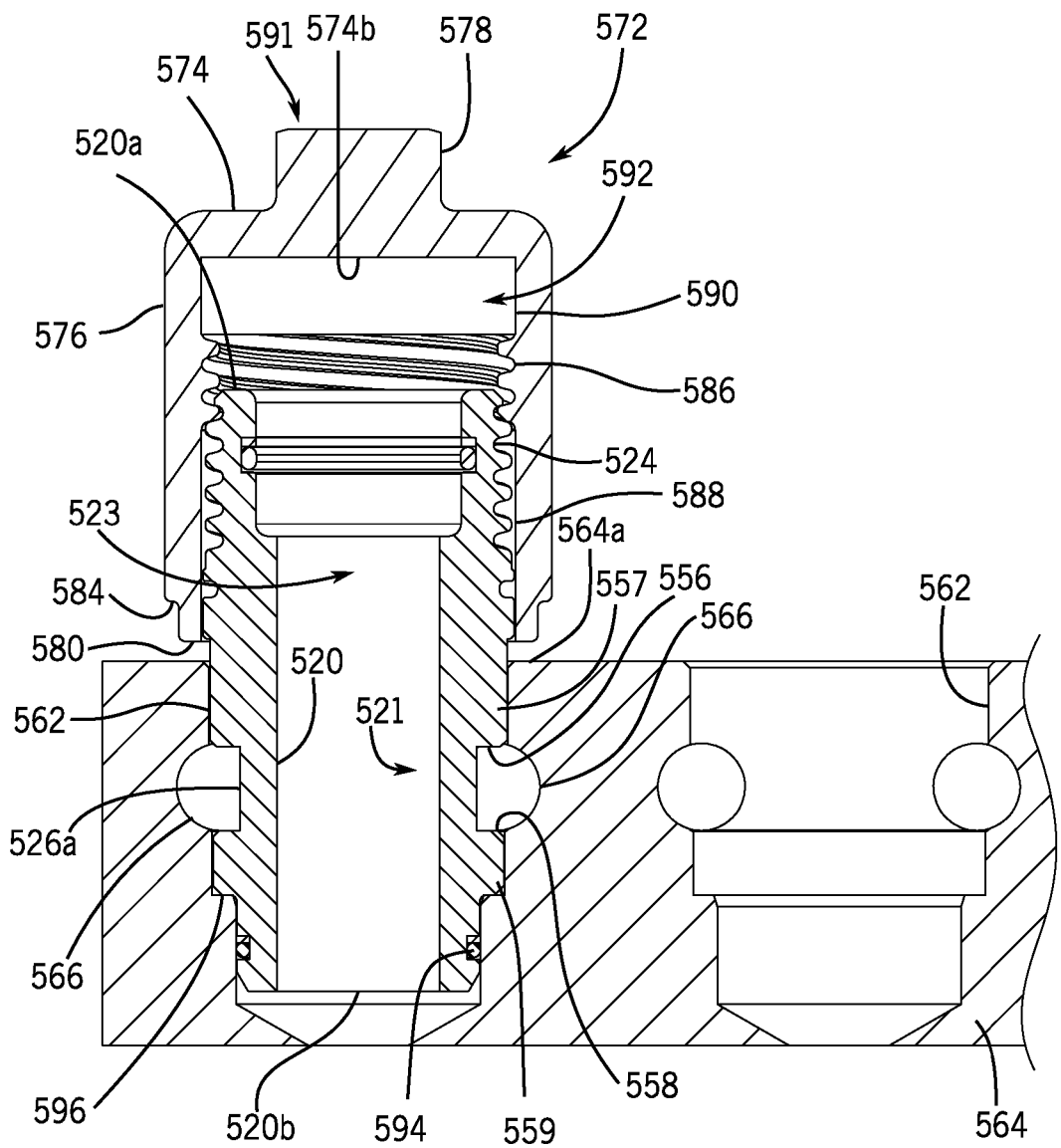
FIG. 14 is a lengthwise section view of the components of FIG. 11 taken along the line 14-14 as shown in FIG. 12.

With reference to FIG. 14, when the adapter 520 is associated with a receiving structure, a first portion 521 of the adapter 520 may be received within a receiving structure, and a second portion 523 of the adapter 520 may protrude from the receiving structure. The first portion 521 of the adapter 520 may include an end face 520b, the retaining member engagement feature 526, the shoulder 557, the flange 559, and a seal or sealing element 594 positioned in the annular seal groove 560 (see FIGS. 8 and 14). The second portion 523 of the adapter 520 may include an end face 520a, the externally-threaded portion 524, and the ridge 525 (see FIGS. 8, 9, and 14).

Figure 9:
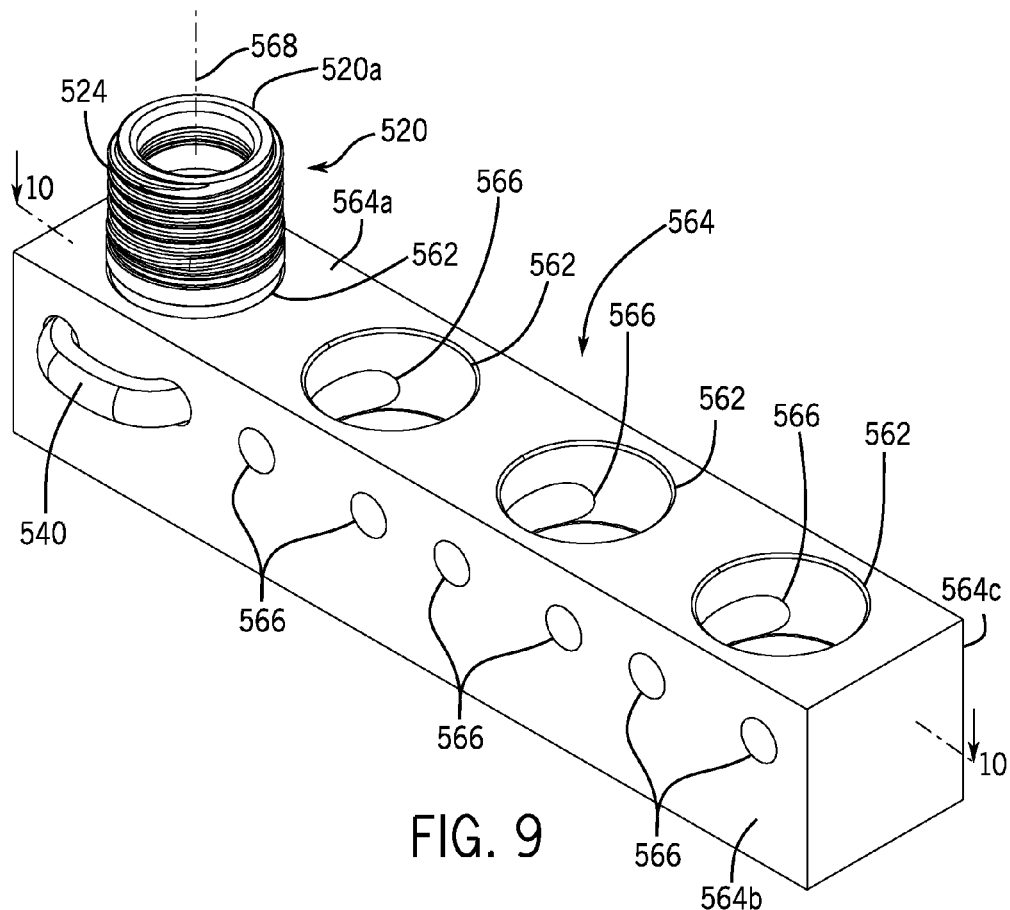
FIG. 9 is an isometric view of the adapter shown in FIG. 8 positioned in a port defined by a manifold.

FIG. 9 is an isometric view of the adapter 520 shown in FIG. 8 positioned in one example of a receiving structure, in this instance a manifold 564 that defines multiple ports 562. Each port 562 may open through a top surface or wall 564a of the manifold 564 and may receive an individual adapter 520. The ports 562 may vary from one another, for example in diameter and/or length, to accommodate differently sized adapters 520. The manifold 564 may be attached to any of a variety of equipment and may receive multiple adapters. Each adapter may be coupled to a fluid conduit, such as a hydraulic hose, that transports fluid between the manifold 564 and a component remotely attached to a respective piece of equipment. The manifold 564 may include opposing side surfaces or walls 564b, 564c, which may define multiple pairs of spaced apart bores 566 that extend through the opposing side walls 564b, 564c. The bores 566 may extend substantially parallel to each other. The bores 566 may extend transversely to a corresponding manifold port 562 and may intersect the peripheral edges of the corresponding port 562. The bores 566 may receive a locking or retaining member 540 that secures the adapter 520 to the manifold 564.

Figure 10:
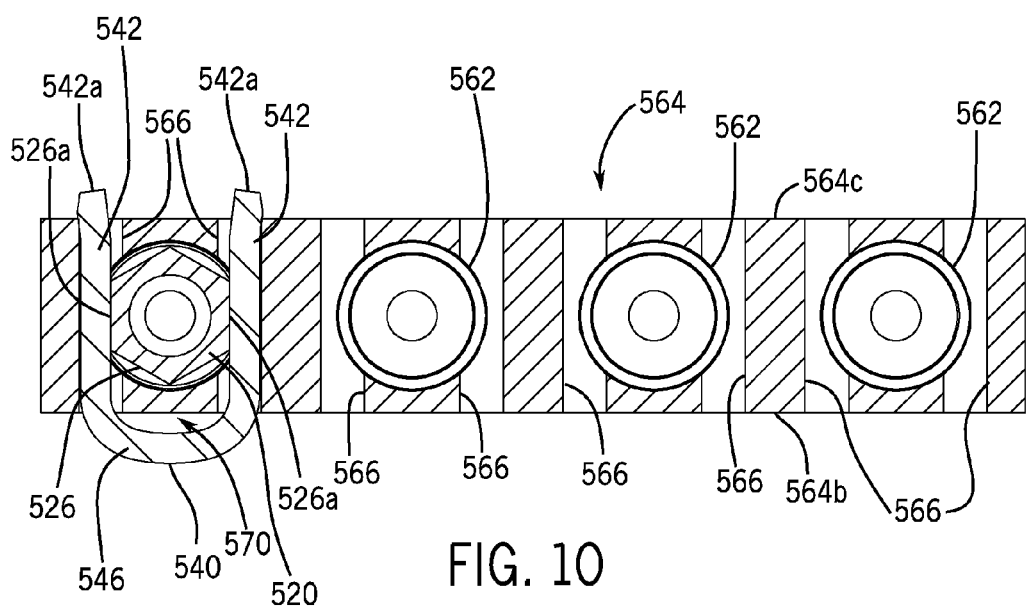
FIG. 10 is a crosswise section view of the adapter, the manifold, and the retaining member of FIG. 9 taken along the line 10-10 as shown in FIG. 9.

FIG. 10 is a section view of the adapter 520, the manifold 564, and the retaining member 540. As shown in FIG. 10, when the adapter 520 is received in one of the manifold ports 562, the retaining member engagement feature 526 of the adapter 520 may be positioned at the appropriate height relative to the bores 566 so that the arms 542 of the retaining member 540 extend past the adapter 520. Each arm 542 of the retaining member 540 may engage an opposing flat 526a of the retaining member engagement feature 526. The engagement of the arms 542 and the opposing flats 526a may prevent or substantially prevent rotation of the adapter 520 about a longitudinal axis 568 (see FIG. 9) relative to the manifold 564. Additionally, the arms 542 may be positioned axially between the radial faces 556, 558 of the adapter 520 (see FIGS. 8 and 14), which may prevent or substantially prevent axial displacement of the adapter 520 along the longitudinal axis 568 (see FIG. 9) relative to the manifold 564. The arms 542 may flare away from one other at their free ends 542a (see FIG. 10) to assist in retaining the retaining member 540 within the bores 566.

In one example, the retaining member 540 may be removed from the bores 566 with a pry tool, such as a flat head screwdriver or pry bar. The pry tool may be inserted into a gap 570 between an interconnecting transverse member 546 of the retaining member 540 and the manifold 564. The pry tool may be used as a lever to separate the retaining member 540 from the manifold 564.

Figure 13:
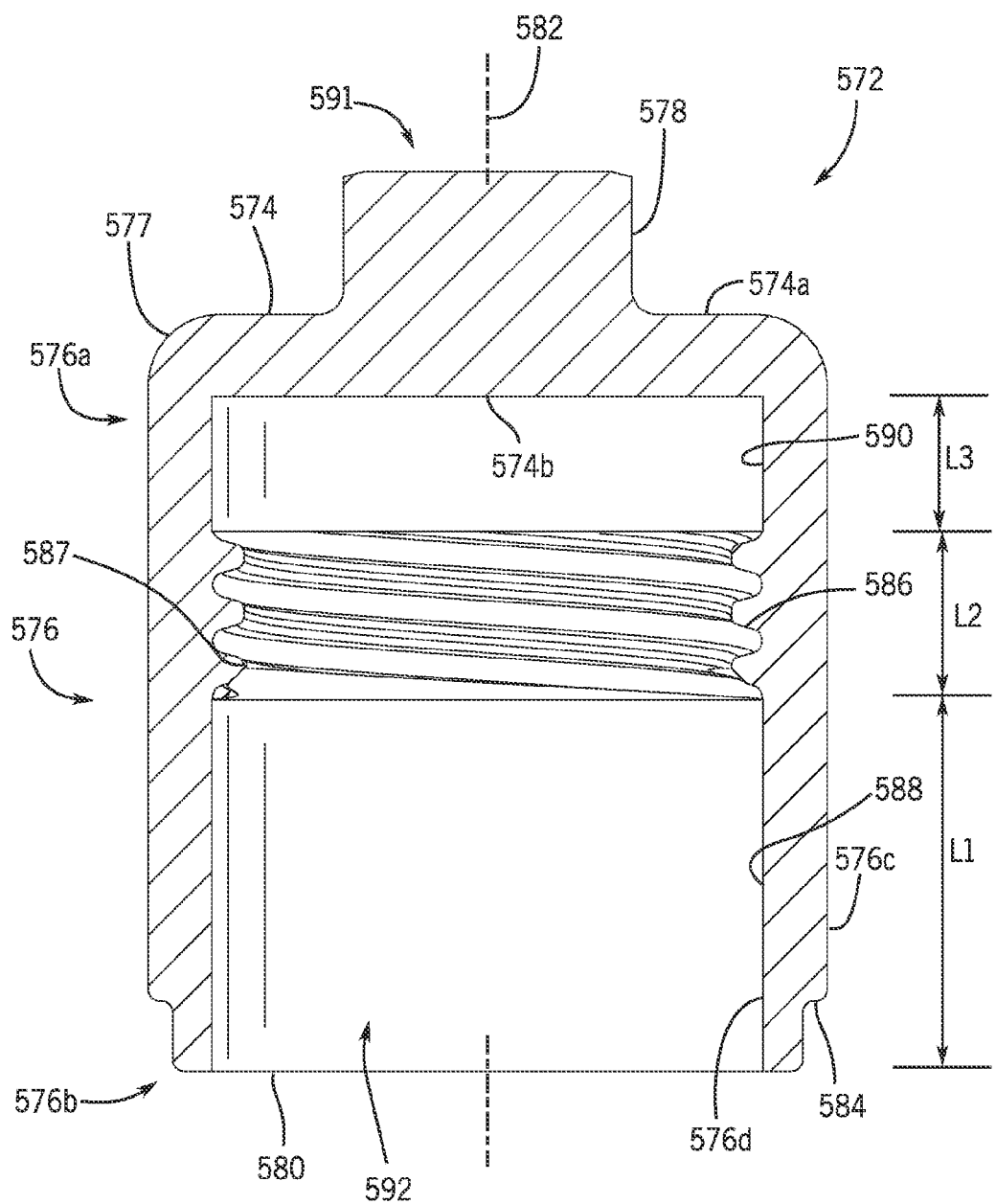
FIG. 13 is a lengthwise section view of the extraction device of FIG. 11 taken along the line 13-13 as shown in FIG. 11.

FIG. 11 is a partially exploded view of the adapter 520, the manifold 564, and the retaining member 540 with an extraction device 572 spaced axially apart from the adapter 520. FIG. 12 is a partially exploded view of the components of FIG. 11, with the extraction device 572 threaded onto the adapter 520. FIG. 13 is a lengthwise section view of the extraction device 572 of FIG. 11 taken along the line 13-13 as shown in FIG. 11. The extraction device 572 may axially draw, extract, or pull the adapter 520 from the port 562 by converting or transforming rotational motion of the extraction device 572 into axial motion of the adapter 520, as described in more detail below.

As shown in FIGS. 11 and 12, the extraction device 572 may include a base or end wall 574 and a side wall 576 extending axially away from a periphery of the end wall 574. The end wall 574 may be oriented transversely, such as perpendicularly, relative to the side wall 576. An engagement feature, such as a hex nut 578, may be centered on the end wall 574 and may project axially away from the end wall 574. A first end 576a of the side wall 576 may be attached to the end wall 574 and include a rounded or chamfered outer edge 577. A second end 576b of the side wall 576 may define an end face 580 of the extraction device 572 (see FIG. 13). A shoulder 584 may be formed in the side wall 576 between the first and second ends 576a, 576b. The shoulder 584 may at least partially define an annular rim associated with the second or bottom end 576b of the side wall 576.

As shown in FIG. 13, the end wall 574 may extend inwardly from the first end 576a of the side wall 576. The end wall 574 may define an external face 574a and an opposing internal face 574b, one or both of which may be oriented transversely, such as perpendicularly, to a longitudinal axis 582 of the extraction device 572. The external face 574a may provide an abutment surface for a tool, such as an impact wrench, which may be engaged with the hex nut 578. The internal face 574b may provide a stop surface for a confronting end face 520a of the adapter 520 (see FIGS. 8, 9, and 11) during axial extraction of the adapter 520 from the manifold 564. The external and internal faces 574a, 574b may be parallel or substantially parallel to one another to define a uniform or substantially uniform thickness of the end wall 574.

Referring still to FIG. 13, the side wall 576 of the extraction device 572 may include an external or outer surface 576c and an internal or inner surface 576d. The outer surface 576c may be cylindrical or substantially cylindrical, which may reduce the rotational envelope of the extraction device 572 during axial extraction of the adapter 520 from the manifold 564. In some implementations the outer surface 576c of the side wall 576 may define a non-cylindrical section. For example, the outer surface 576c of the side wall 576 may define an engagement feature, such as one or more of the engagement features 126, 139, 226, 239 shown in FIGS. 1-2 and 5, for interaction with a tool, such as a wrench, to facilitate rotation of the extraction device 572 relative to the manifold 564. Additionally or alternatively, the outer surface 576c may include knurling, such as the knurling 138 shown in FIG. 1-2.

The outer surface 576c of the side wall 576 may step radially inwardly to define a shoulder 584. The shoulder 584 may be positioned proximate to the end face 580 of the extraction device 572 and may define a surface feature to engage with a pry tool. The pry tool may be leveraged against the manifold 564 to apply an additional removal force to the extraction device 572 during withdrawal of the adapter 520 from the manifold 564. The shoulder 584 may extend continuously (such as annularly) or discontinuously around the periphery of the extraction device 572. The shoulder 584 may at least partially define an annular bottom rim extending axially from the shoulder 584 to the leading edge 580 of the extraction device 572. One or more recesses or apertures may be formed in the outer surface 576c of the side wall 576 for engagement by a tool that applies an axial force, a rotational force, or a combination of rotational and axial forces.

With continued reference to FIG. 13, the inner surface 576d of the side wall 576 may include a threaded portion 586 that matingly engages the external thread 524 of the adapter 520. The threaded portion 586 may include an axial length L2, as shown in FIG. 13. The threaded portion 586 may include one or more threads. In implementations with multiple threads, the threaded portion 586 may engage the externally-threaded portion 524 of the adapter 520 with reduced rotation of the extraction device 572 relative to the adapter 520 as the multiple threads may provide multiple circumferentially-spaced starting points.

With continued reference to FIG. 13, the threaded portion 586 may include a modified thread termination to facilitate thread engagement. As depicted in FIG. 13, the threaded portion 586 may include a Higbee flattened thread start or termination 587, which may make the thread easier to start (by reducing the tendency to cross-thread) and less susceptible to damage. The Higbee flat or flattened thread termination 587 may eliminate or substantially eliminate a sharp edge that may occur at a terminal end of a thread. The Higbee flattened thread termination 587 may be cut through the entire base of the thread or just flatten the sharp edge. With trapezoidal thread forms, such as an Acme thread form, the flat may be created at the width of the thread crest, such that it has a constant width running from the root to the crest of the thread.

The inner surface 576d of the side wall 576 may include a leading non-threaded portion 588 extending axially between the end face 580 and the threaded portion 586. The non-threaded portion 588 may reduce the number of revolutions of the extraction device 572 about the longitudinal axis 582 prior to the end face 580 contacting the top surface 564a of the manifold 564 (see FIGS. 14-16), thereby reducing the time needed to extract the adapter 520 from the port 562. The leading non-threaded portion 588 may have an axial length L1, which may ensure the internally-threaded portion 586 threadedly engages the externally-threaded portion 524 of the adapter 520 prior to abutment of the end face 580 of the extraction device 572 against the top surface 564a of the manifold 564.

With further reference to FIG. 13, the inner surface 576d of the side wall 576 may include a trailing non-threaded portion 590 extending axially between the threaded portion 586 and the internal face 574b of the end wall 574. The trailing non-threaded portion 590 may ease formation of the threaded portion 586 by separating the threaded portion 586 from the internal face 574b of the end wall 574, which may prevent or substantially prevent the formation of an imperfect or incomplete thread proximate the end wall 574, thereby reducing binding and/or premature bottoming-out of the adapter 520 in the extraction device 572. The trailing non-threaded portion 590 may have an axial length L3, which may be sized to ensure the externally-threaded portion 524 of the adapter 520 remains in threaded engagement with the internally-threaded portion 586 of the extraction device 572 during removal of the adapter 520 from the manifold 564. In some implementations, the confronting end face 520a of the adapter 520 does not engage the internal face 574b of the extraction device 572 during extraction of the adapter 520 from the manifold 564. In these implementations, the leading edge 580 of the extraction device 572 remains in contact with the top surface 564a of the manifold 564 during the extraction process and rotation of the extraction device 572 results in axial motion of the adapter 520 relative to the device 572. Alternatively, in some implementations, the confronting end face 520a of the adapter 520 engages the internal face 574b of the extraction device 572 during extraction of the adapter 520 from the manifold. In these implementations, after engagement of the confronting faces 520a, 574b, the adapter 520 turns in unison with the extraction device 572.

Referring still to FIG. 13, the leading and trailing non-threaded portions 588, 590 of the inner surface 576d of the side wall 576 may be cylindrical or substantially cylindrical. The threaded portion 586 may include a major diameter that is substantially congruent with the externally-threaded portion 524 of the adapter 520. The major diameter of the threaded portion 586 may be radially aligned with the leading non-threaded portion 588, the trailing non-threaded portion 590, or both as illustrated in FIG. 13. In implementations where the leading non-threaded portion 588 is radially aligned with the major diameter of the threaded portion 586, the leading non-threaded portion 588 may ensure axial alignment of the internally-threaded portion 586 of the extraction device 572 and the externally-threaded portion 524 of the adapter 520, thereby preventing or substantially preventing cross-threading, which may be especially beneficial in circumstances where a power wrench, such as an impact wrench, is used.

Figure 18:
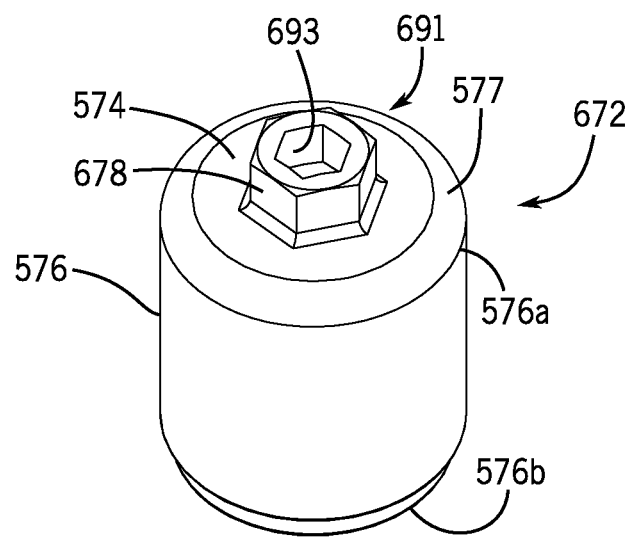
FIG. 18 is an isometric view of the extraction device of FIG. 11 with a modified engagement feature.
Figure 19:
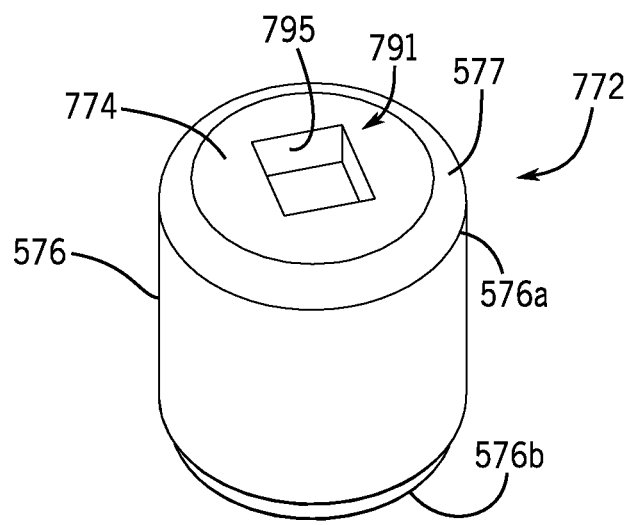
FIG. 19 is an isometric view of the extraction device of FIG. 11 with a different engagement feature.

With continued reference to FIG. 13, the extraction device 572 may include an engagement feature 591 that interacts with a tool, such as an impact wrench, to rotate the extraction device 572 about the longitudinal axis 582. The engagement feature 591, such as the hex nut 578, may project axially away from the external face 574a of the end wall 574 along the longitudinal axis 582 of the extraction device 572. Additionally or alternatively, the engagement feature 591 may be internally keyed to facilitate engagement with a complementary keyed tool, such as a hex key or socket driver. An example is shown in FIG. 18, in which the extraction device 672 includes an engagement feature 691 having a hex nut 678 that is internally keyed with a hexagonal receptacle 693. As shown in FIG. 13, the end wall 574 may be continuous and close the first end 576a of the side wall 576. Alternatively, the end wall 574 may be discontinuous. In some implementations, the end wall 574 may define an aperture or recess with a keyed shape that accepts or receives a complementary keyed tool, such as a hex key or socket driver. An example is shown in FIG. 19, in which the extraction device 772 includes an engagement feature 791 comprised of a square aperture 795 formed in the end wall 774. The engagement feature 591, 691, 791 may include an elliptical, polygonal, or other suitable keyed shape that is operative to transfer rotational force to the extraction device 572, 672, 772 from a tool with a complementary-shaped drive member.

Figure 15:
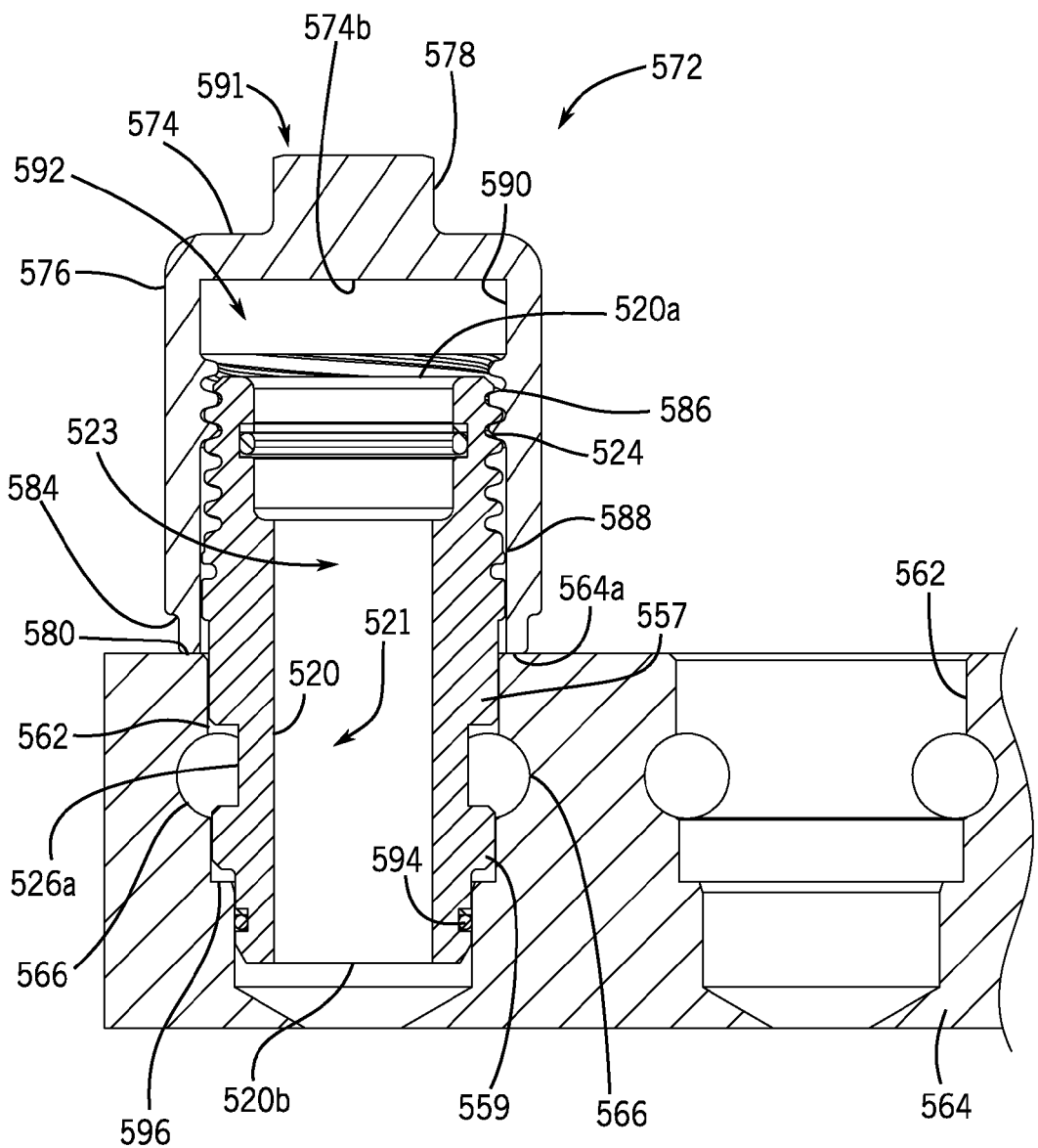
FIGS. 15 and 16 are representative section views similar to that of FIG. 14, showing the adapter in various stages of removal.
Figure 16:
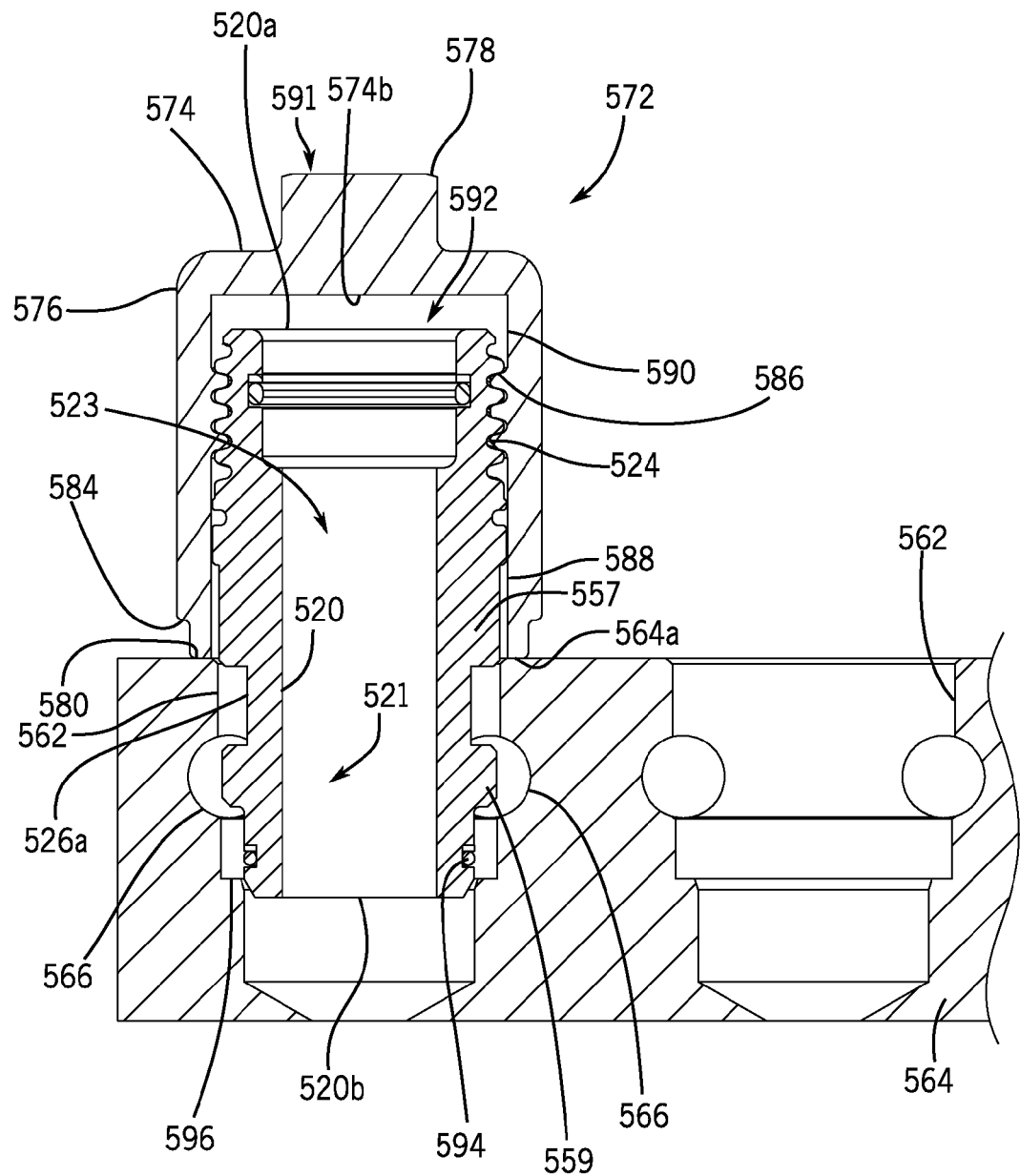

FIGS. 14, 15, and 16 are section views with the adapter 520 in various stages of removal from the manifold 564. Referring to FIG. 14, the adapter 520 is fully seated within the port 562 defined by the manifold 564. The radially-projecting flange 559 of adapter 520 is seated against an abutment shoulder 596 of the manifold 564, and the sealing element 594 is sealingly engaged with an internal wall of the manifold 564. In this fully seated position, the facets 526a of the adapter 520 axially correspond to the transversely-extending bores 566 formed in the manifold 564 so that the arms 542 of the retaining member 540 may axially and rotationally secure the adapter 520 to the manifold 564. By rotationally locking the adapter 520 within the port 562, the retaining member 540 and corresponding facets 526a facilitate threaded engagement of the externally-threaded portion 524 of the adapter 520 with a retaining member 130, 230, 430 or other internally-threaded coupler.

Referring still to FIG. 14, the retaining member 540 (see FIGS. 9-12) is removed from the bores 566 formed in the manifold 564 to permit axial displacement of the adapter 520 from the port 562 (upward relative to FIG. 14). The extraction device 572 is positioned over the second portion 523 of the adapter 520, which is received within the inner space 592 of the extraction device 572. The end face 580 of the extraction device 572 is axially spaced apart from a confronting face 564a of the manifold 564 at this removal stage. By threading the extraction device 572 onto the second portion 523 of the adapter 520, the extraction device 572 advances axially along the adapter 520 until the leading edge or end face 580 of the extraction device 572 abuts the top confronting surface or wall 564a of the manifold 564. As shown in FIG. 14, the internally-threaded portion 586 of the extraction device 572 is threadedly engaged with the externally-threaded portion 524 of the adapter 520.

Referring to FIG. 15, the end face 580 of the extraction device 572 is abutted against a portion of the top surface 564a of the manifold 564 that surrounds the port 562. After abutment, further rotation of the extraction device 572 causes the internally-threaded portion 586 to apply an axial extraction force to the adapter 520 via the externally-threaded portion 524 of the adapter 520. This axial force draws or extracts the adapter 520 from the port 562 by translating the externally-threaded portion 524 of the adapter 520 relative to the internally-threaded portion 586 of the extraction device 572. In FIG. 15, the extraction device 572 has axially translated the adapter 520 and unseated the flange 559 from the abutment shoulder 596, yet the sealing element 594 remains in engagement with the internal wall of the port 562.

Referring to FIG. 16, the end face 580 of the extraction device 572 remains abutted against the confronting face 564a of the manifold 564. Continued rotation of the extraction device 572 about the adapter 520 further extracts the adapter 520. In FIG. 16, the extraction device 572 has unseated the sealing element 594 from the internal wall of the port 562, and the confronting end face 520a of the adapter 520 is axially spaced apart from the internal face 574b of the extraction device 572 to permit further axial displacement of the adapter 520 from the port 562 into the inner space 592 of the extraction device 572. A pry tool may be engaged with the peripheral shoulder 584 of the extraction device 572 during the adapter extraction process to apply an additional withdrawal force.

Figure 17:
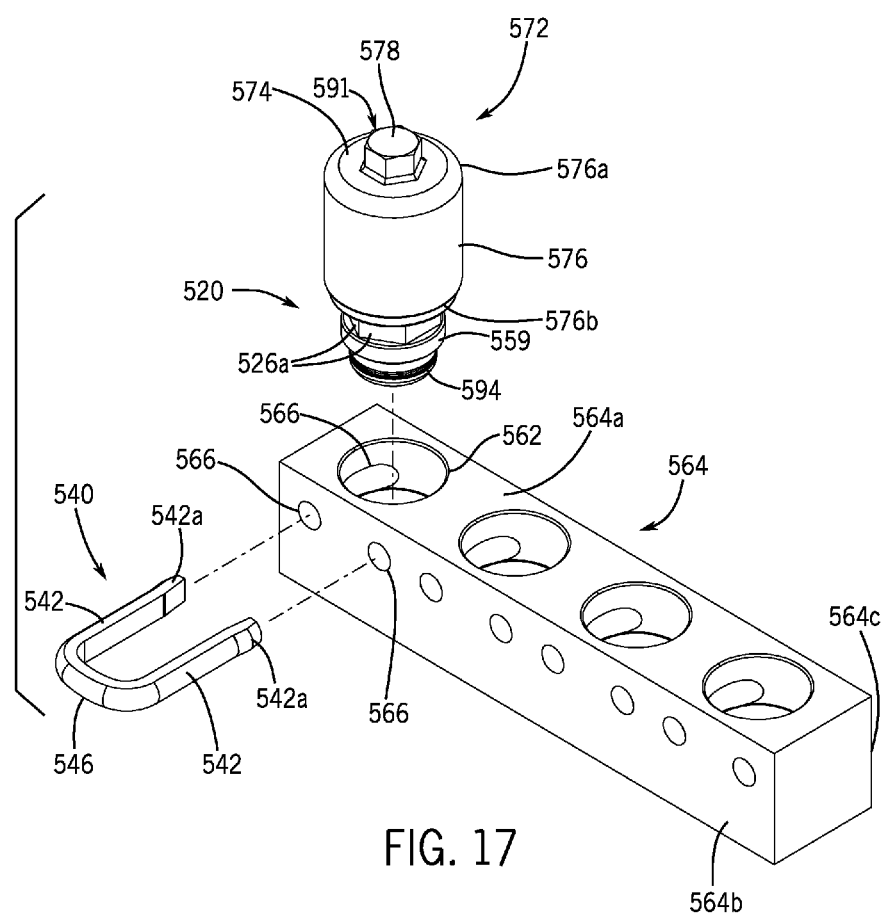
FIG. 17 is a partially exploded view of the components of FIG. 11 with the adapter positioned in the extraction device and removed from the manifold.

FIG. 17 is a partially exploded view of the components of FIG. 11 with the adapter 520 removed from the manifold 564. As shown in FIG. 17, upon removal of the adapter 520 from the manifold 564, the adapter 520 may remain threadedly engaged with the extraction device 572. In this configuration, the facets 526a, the flange 559, and the sealing element 594 may be exposed, while the externally-threaded portion 524 and the confronting end face 520a may be concealed within the extraction device 572. To remove the adapter 520 from the extraction device 572, the adapter 520 and/or the extraction device 572 may be rotated relative to one another to unthread the internally-threaded portion 586 of the extraction device 572 from the externally-threaded portion 524 of the adapter 520.

The extraction device may provide a mechanical advantage as a result of the internally-threaded portion, which may be useful in applications where an externally-threaded component is seized or stuck in a receiving structure. The extraction device may allow a secondary extraction force to be applied, if needed. The extraction device may include an engagement feature associated with an end wall of the extraction device to accommodate space constraints.

The foregoing description has broad application. The extraction device may be used to axially extract or remove any externally-threaded adapter, connector, coupler, or fitting from a receiving structure where an external thread is exposed. Accordingly, the discussion of any example is meant only to be explanatory and is not intended to suggest that the scope of the disclosure, including the claims, is limited to these examples. In other words, while illustrative examples of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A method of removing an adapter from a port defined by a structure, the method comprising:
    positioning a one-piece extraction device around a portion of the adapter;
    threadedly engaging an internal thread of the extraction device with an external thread of the adapter by rotating the extraction device about the adapter;
    abutting a leading edge of the extraction device against an external face of the structure;
    axially extracting the adapter at least partially from the port by continuing to rotate the extraction device about the adapter after the leading edge of the extraction device is abutted against the external face of the structure; and
    engaging an external annular shoulder positioned proximate to the leading edge of the extraction device with a pry tool and thereby applying an axial force to move the extraction device axially away from the structure.

2. The method of claim 1 further comprising advancing the extraction device axially along the adapter toward the structure prior to abutting the leading edge against the structure by continuing to rotate the extraction device about the adapter.

* * * * *